United States Patent [19]

Moser

[11] Patent Number: 5,740,766
[45] Date of Patent: Apr. 21, 1998

[54] AUTOMOTIVE FAN AND SHROUD ASSEMBLY

[75] Inventor: George Moser, Wixom, Mich.

[73] Assignee: Behr America, Inc., Charleston, S.C.

[21] Appl. No.: 826,350

[22] Filed: Mar. 25, 1997

[51] Int. Cl.$^6$ ...................................................... F01P 7/10
[52] U.S. Cl. ........................... 123/41.49; 416/55; 416/60; 416/215; 415/173.6
[58] Field of Search ........................... 123/41.49; 416/55, 416/60, 133, 136, 174, 186, 185, 215, 216, 219 R; 415/173.6

[56] References Cited

U.S. PATENT DOCUMENTS

| | | | |
|---|---|---|---|
| 3,487,805 | 1/1970 | Satterthwaite et al. | 415/173.6 |
| 3,680,977 | 8/1972 | Rabouyt et al. | |
| 3,842,902 | 10/1974 | Poslusny . | |
| 3,915,024 | 10/1975 | Mort | 123/41.49 |
| 4,007,999 | 2/1977 | Serizawa . | |
| 4,175,388 | 11/1979 | Milbreath et al. | |
| 4,398,508 | 8/1983 | Moon et al. | 123/41.49 |
| 4,406,581 | 9/1983 | Robb et al. | 123/41.49 |
| 4,774,911 | 10/1988 | Yamaguchi et al. | 123/41.49 |
| 4,962,734 | 10/1990 | Jorgensen | 123/41.49 |
| 5,183,382 | 2/1993 | Carroll . | |
| 5,342,173 | 8/1994 | Vera . | |
| 5,522,706 | 6/1996 | Mannava et al. | 416/215 |
| 5,547,340 | 8/1996 | Dalton et al. | 415/173.6 |

FOREIGN PATENT DOCUMENTS

| | | |
|---|---|---|
| 646799 | 10/1935 | Germany . |
| 324793 | 2/1930 | United Kingdom . |
| 2116642 | 9/1983 | United Kingdom . |

*Primary Examiner*—Erick R. Solis
*Attorney, Agent, or Firm*—Howard & Howard

[57] ABSTRACT

An assembly (12) for moving air through a heat exchanger (10) comprising a shroud (14) for mating with a heat exchanger (10) and a fan (20) disposed in the rear opening (18) of the shroud (14). The fan (20) comprises a hub (22) having an axis (A) and blades (24) extending radially from the hub (22) to distal ends for moving air through the shroud (14). The assembly is characterized by a bearing ring mechanism (28, 30) interconnecting the distal ends of the blades (24) and the shroud (14) for rotatably supporting the fan (20) solely by the shroud (14). The bearing ring mechanism (28, 30) includes a ring (28) surrounding and interconnecting the distal ends of the fan blades (24) and a guideway (30) in the shroud (14) supporting and retaining a head (32) extending from the ring (28) for rotation relative to the shroud (14). Also disclosed is a floating drive assembly (52, 54, 56) including an inner drive member (64), an outer drive member (68, 70), and a flexible transmission (74, 75) interconnecting the members for rotating the drive members together while allowing relative radial movement between the drive members as the drive members rotate the fan (20).

10 Claims, 5 Drawing Sheets

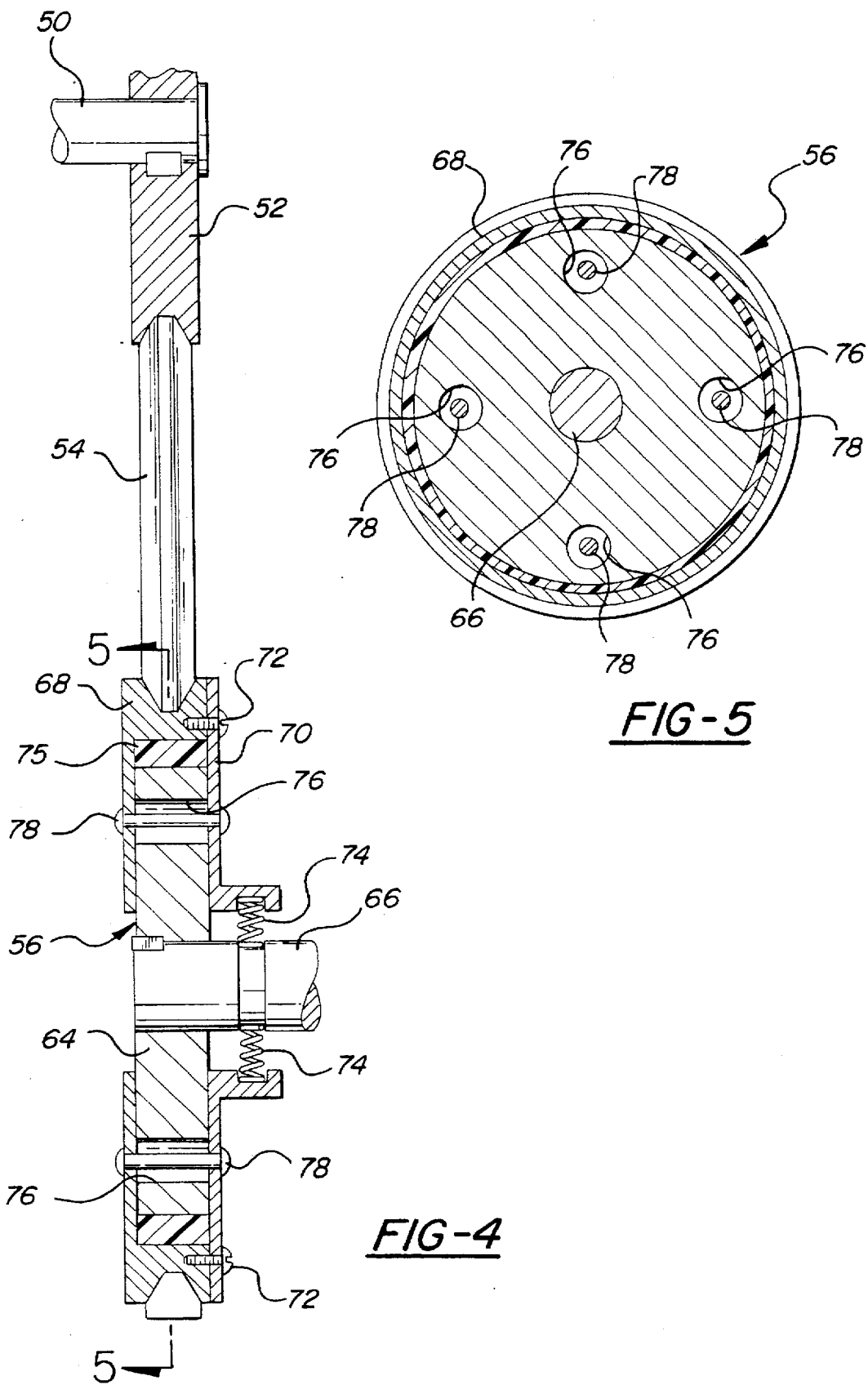

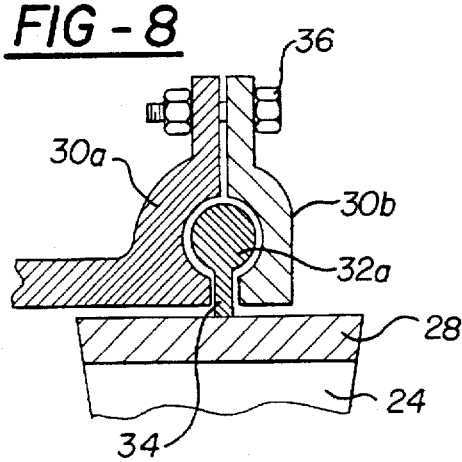
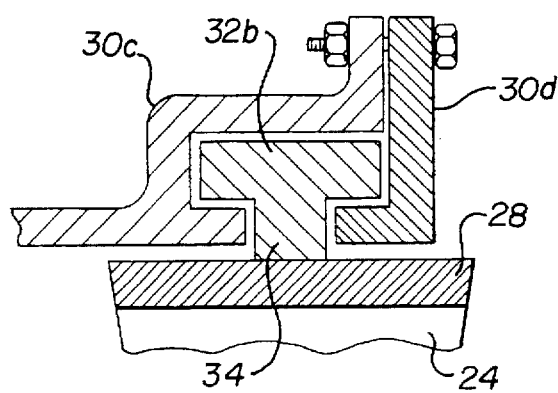
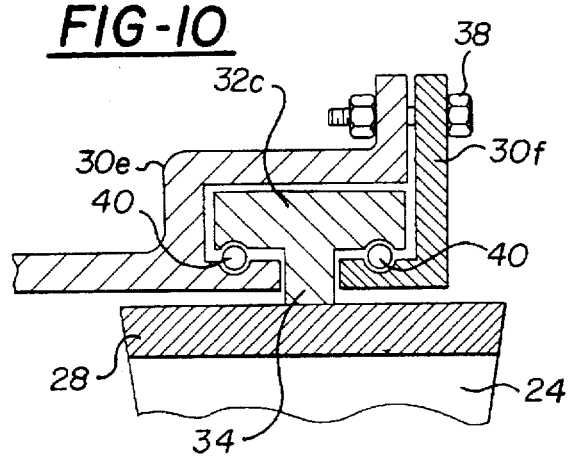
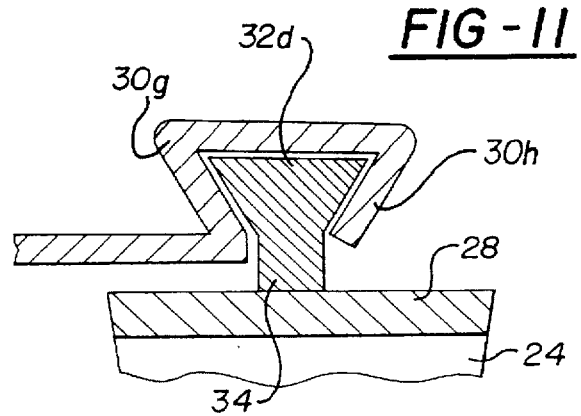

AUTOMOTIVE FAN AND SHROUD ASSEMBLY

TECHNICAL FIELD

The subject invention relates to automotive vehicle cooling and, more particularly, to the fan and shroud combination for directing air through an adjacent heat exchanger.

BACKGROUND OF THE INVENTION

Automotive vehicles are powered by liquid cooled engines. The liquid is cooled by being circulated through a heat exchanger. The heat exchanger transfers heat from the liquid to air passing through the heat exchanger. The air is moved through the heat exchanger by a fan. In order to maximize the air flow through the heat exchanger to maximize the capacity to withdraw heat from the liquid, a cowling or shroud surrounds the fan and the heat exchanger. It is the objective of the shroud to prevent leakage of air around the heat exchanger, i.e., to prevent leakage and make sure all of the air moved by the fan moves through the heat exchanger.

The fan includes a plurality of radially extending blades with the distal ends of the blades adjacent the shroud. There have been various developments for reducing the leakage between the distal ends of the fan blades and the shroud. The U.S. Pat. No. 3,680,977 to Rabouyt et al discloses elastic seals and U.S. Pat. No. 3,842,902 to Poslusny discloses a combination of labyrinthine seals while U.S. Pat. No. 5,183,382 discloses a combination of elastic or flexible members in a labyrinth-type seal combination. On the other hand, the U.S. Pat. No. 5,342,173 to Vera discloses a profiled annular hoop at the distal ends of the fan blades for aerodynamically controlling air flow.

SUMMARY OF THE INVENTION AND ADVANTAGES

An assembly for moving air through a heat exchanger comprising a shroud presenting a front opening for mating with a heat exchanger and presenting a rear opening with a fan disposed in the rear opening of the shroud. The fan includes a hub having an axis and blades extending radially from the hub to distal ends for moving air through the shroud. The assembly is characterized by a bearing ring mechanism interconnecting the distal ends of the blades and the shroud for rotatably supporting the fan solely by the shroud.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a cross sectional view of the drive assembly;

FIG. 5 is a cross sectional view of the floating drive member of the subject invention;

FIGS. 8 through 11 are fragmentary cross sectional views of various embodiments of the bearing ring mechanism interconnecting the distal ends of the blades.

DETAILED DESCRIPTION OF THE PREFERRED EMBODIMENT

Figure 1:
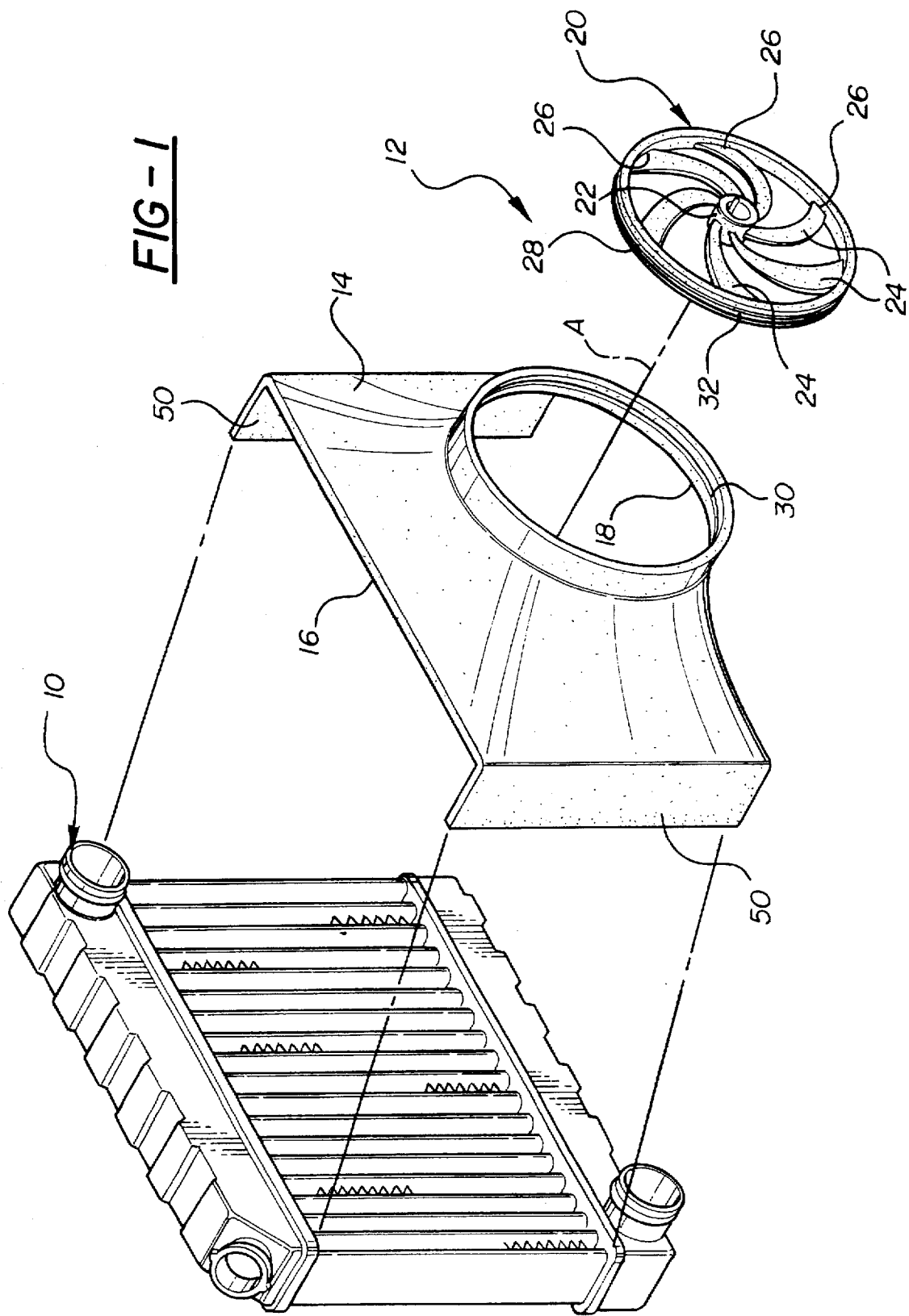
FIG. 1 is an exploded perspective view of an assembly constructed in accordance with the invention.

Referring to the Figures, wherein like numerals indicate like or corresponding parts throughout the several views, an assembly for moving air through a heat exchanger, generally shown at 10, is generally shown at 12. The assembly 12 includes a shroud 14 presenting a front opening 16 for mating with the heat exchanger 10 and presenting a rear opening 18. The assembly 12 also includes a fan 20 disposed in the rear opening 18 and comprising a hub 22 having an axis A and blades 24 extending radially from the hub 22 to distal ends 26 (shown in FIG. 1) for moving air through the shroud 14.

The assembly 12 is characterized by a bearing ring mechanism 28, 30 interconnecting the distal ends 26 of the blades 24 and the shroud 14 for rotatably supporting the fan 20 solely by the shroud 14. The bearing ring mechanism 28, 30 includes a ring 28 surrounding and interconnecting the distal ends 26 of the fan blades 24 and a guideway 30 supporting and retaining the ring 28 for rotation relative to the shroud 14. The ring 28 defines a head 32 as viewed in cross section and the guideway 30 embraces the head 32. As illustrated in FIGS. 8 through 11, the ring 28 also defines a web 34 extending radially as viewed in cross section to support the head. The web 34 is more narrow in the axial direction than the head and the guideway 30 embraces the head adjacent each side of the web 34 to underlie the head. In other words, the guideway 30 is C-shaped to encircle the head with the web 34 extending through the opening of the C-shape.

Various alternative constructions of the head 32 and guideway 30 are illustrated in FIGS. 8 through 11. In FIG. 8, the head 32a has a spherical shape as viewed in cross section and the guideway is defined by two components 30a and 30b and a connection bolt 36 for connecting the components 30a and 30b together to embrace the spherical head 32a. In FIG. 9, the head 32b has a rectangular shape as viewed in cross section and the guideway is defined by two components 30c and 30d and connection adhesive connects the components 30c and 30d together to embrace the rectangular head 32b. In FIG. 10, the head 32c has a rectangular shape as viewed in cross section and the guideway is defined by two components 30e and 30d and a connection bolt 38 connects the components 30e and 30d together to embrace the rectangular head 32c. In addition, a plurality of beatings 40 are disposed between the flanges of the head 32c and the lips of the guideway as defined by the components 30e and 30d thereof. In FIG. 11, the head 32d has a triangular shape as viewed in cross section and the guideway is defined by two integral components 30g and 30h and the terminal component 30h is wrapped around the head 32d for connecting the guideway 30a and 30b to the triangular head 32d.

The assembly 12 also includes a floating drive assembly operatively connected to the fan 20 for rotating the fan 20 relative to the shroud 14 while allowing relative radial movement between the drive assembly and the axis A of the hub 22 to accommodate relative movement between the drive assembly and the fan 20 as the drive assembly rotates the fan 20.

Figure 2:
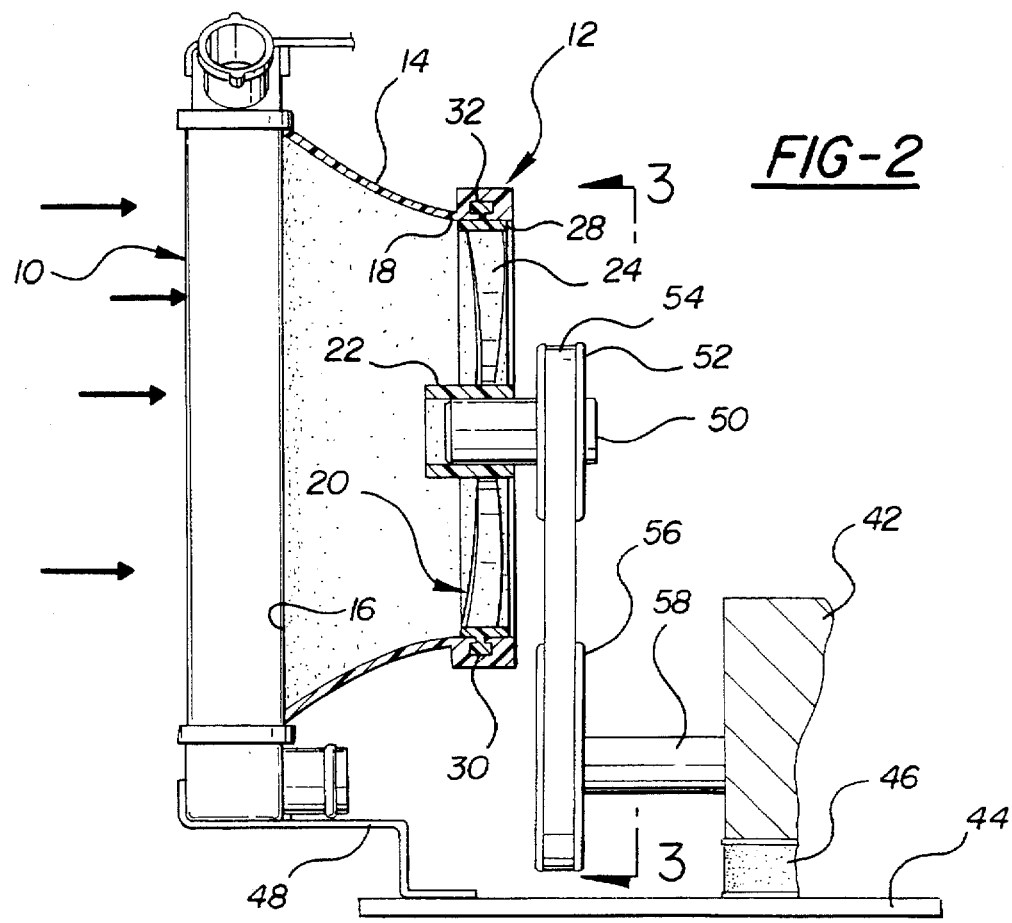
FIG. 2 is a schematic side view partially broken away and in cross section.

In the embodiment of FIG. 2, the drive assembly transmits power from an automotive engine 42 to the fan 20. An automotive vehicle includes a frame 44 and the engine 42 is supported on the frame 44 by motor mounts 46 for vibrational type movement relative thereto, as is well known in the art. The heat exchanger 10 is supported by the frame 44 through bracket 48 adjacent the heat exchanger 10 for directing air through the heat exchanger. Actually, the shroud 14 has side flanges 50 (FIG. 1) which are bolted or otherwise secured to the sides of the heat exchanger 10 for engaging the front opening 16 of the shroud 14 in air tight relationship with the heat exchanger. As is well known, the engine vibrates or otherwise racks and moves relative to the frame 44 and consequently the heat exchanger 10 and shroud 14. The motor mounts 46 are made of resilient material to accommodate such relative movement.

Figure 3:
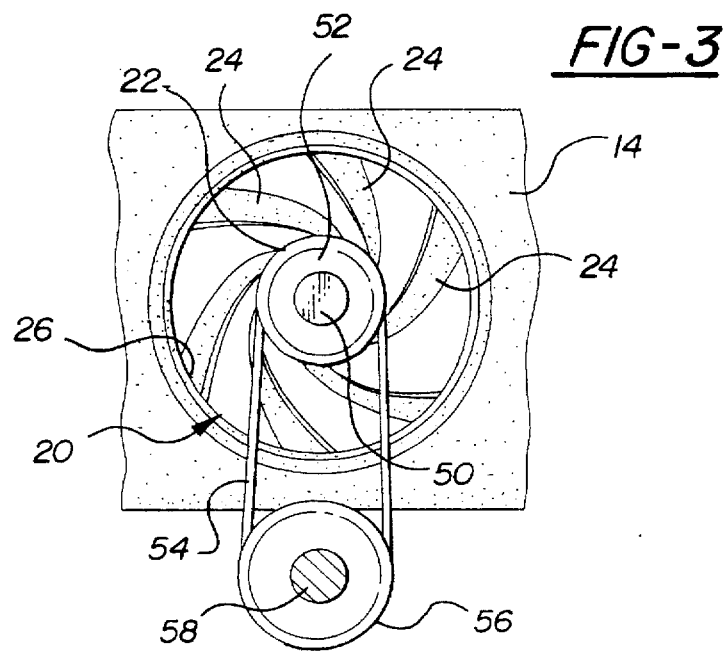
FIG. 3 is a view taken substantially along line 3—3 of FIG. 2.
Figure 6:
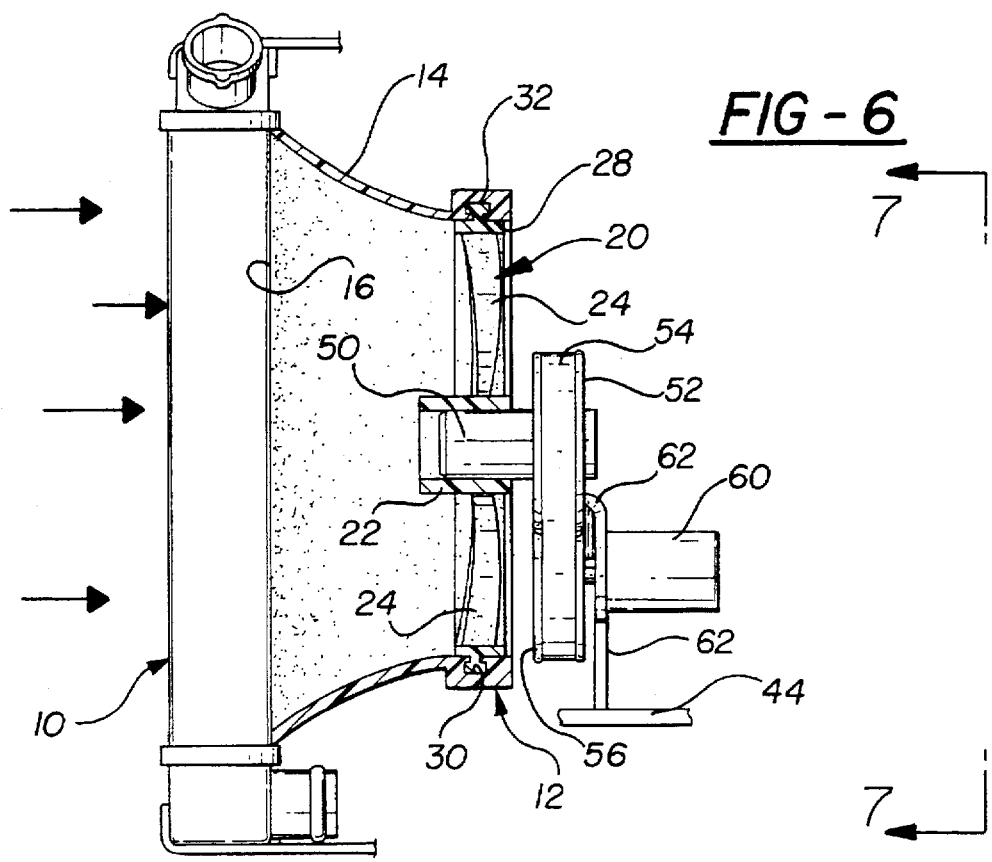
FIG. 6 is a view like FIG. 2 but showing an alternative embodiment.
Figure 7:
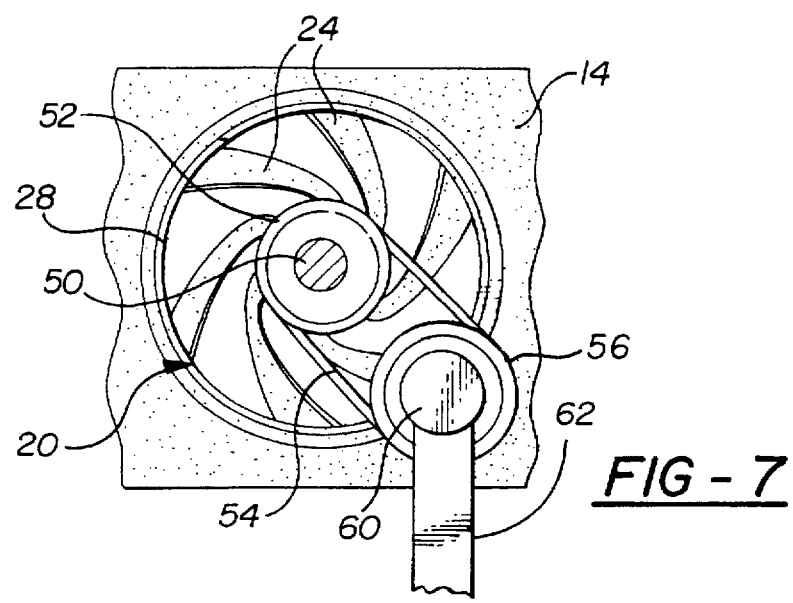
FIG. 7 is a view taken substantially along line 7—7 of FIG. 6.

The subject invention provides a drive assembly which allows relative movement between the drive input and the fan 20. Such a drive assembly allows the elimination of the gap between the tips of the fan blades and the shroud, which, in turn, to prevent air leakage around the tips of the fan blades. The hub 22 is keyed to and driven by a shaft 50, which is, in turn, rotated by the pulley 52. A drive belt 54 is entrained around the pulley 52 and a floating pulley 56. In the embodiment of FIGS. 2 and 3, the floating pulley 56 is keyed to and rotated by the shaft 58 which is rotated by the engine 46, i.e., the drive assembly operatively interconnects the engine 46 and the fan 20 to accommodate the vibrational type movement of the engine 46 relative to the fan 20. In the embodiment of FIGS. 6 and 7, the floating pulley 56 is keyed to and rotated by a shaft which is rotated by an electric motor 60. The electric motor 60 is supported by the shroud 14 via a bracket 62 which bolted or glued to support structure, such as the vehicle frame 44 or the shroud 14.

The floating pulley is generally indicated at 56 in FIGS. 4 and 5 and is characterized by including an inner drive member 64 keyed to a shaft 66 and a two component outer drive member 68, 70. The outer drive member comprises a primary component 68 which includes a belt receiving annular pulley ring extending around and in radially spaced relationship to the periphery of the inner drive member 64. A flange extends radially inwardly from the annular pulley ring to slidably engage the side of the inner drive member 64. A secondary component 70 of the outer drive member comprises a disc secured with fasteners 72 to the open side of the annular pulley ring to slidably engage the other side of the inner drive member 64. Accordingly, the inner drive member 64 is disposed and retained between the radially inwardly extending flanges of the outer drive member 68, 70. A flexible transmission interconnects the inner 64 and outer 68 drive members for rotating the drive members together while allowing relative radial movement between the drive members as the drive members rotate the fan. The flexible transmission is based upon a resilient or flexible component disposed between the inner 64 and outer 68, 70 drive members. As illustrated, that resilient or flexible component is defined by a plurality of springs 74 which are disposed between the shaft 66 and an annular collar 77 extending axially from the disc component 70. Alternatively or in addition, an elastic material 75 may be disposed in the radial space between the periphery of the inner drive member 64 and the inside of the annular pulley ring of the primary component 68 of the outer drive member. The inner drive member 64 has a plurality of holes 76 extending therethrough form side to side and pins 78 are supported between the side flange of the primary component 68 and the secondary disc component 70 to extend through the holes 76. Accordingly, the outer drive member 68, 70 may orbit in a vertical plane relative to the inner drive member 64. Therefore, the resilient or flexible connection, through the springs 74 rotates the drive members 64 and 68, 70 together while allowing relative radial, i.e., orbital or offset, movement between the drive members as the drive members rotate the fan 20.

The invention has been described in an illustrative manner, and it is to be understood that the terminology which has been used is intended to be in the nature of words of description rather than of limitation.

Obviously, many modifications and variations of the present invention are possible in fight of the above teachings. It is, therefore, to be understood that within the scope of the appended claims, wherein reference numerals are merely for convenience and are not to be in any way limiting, the invention may be practiced otherwise than as specifically described.

What is claimed is:

1. An assembly (12) for moving air through a heat exchanger (10) comprising:

a shroud (14) presenting a front opening (16) for mating with a heat exchanger (10) and presenting a rear opening (18), a fan (20) disposed in said rear opening (18) comprising a hub (22) having an axis (A) and blades (24) extending radially from said hub (22) to distal ends for moving air through said shroud (14), and a bearing mechanism (28, 30) interconnecting said distal ends of said blades (24) and said shroud (14) for rotatably supporting said fan (20) solely by said shroud (14) and including a ring (28) surrounding and interconnecting said distal ends of said fan blades (24) and a guideway (30) in said shroud (14) supporting and retaining said ring (28) for rotation relative to said shroud (14), and wherein said ring (28) defines a head (32) as viewed in cross section and said guideway (30) embraces said head (32).

2. An assembly as set forth in claim 1 wherein said ring (28) defines a web (34) extending radially as viewed in cross section to support said head (32), said web (34) being more narrow in the axial direction than said head (32) and said guideway (30) embraces said head (32) adjacent each side of said web (34) to underlie said head (32).

3. An assembly as set forth in claim 1 wherein said guideway (30) is defined by two components (30a,b,c,d,e,f,g and h) and a connection (36, 38) for connecting said components together to embrace said head (32).

4. An assembly as set forth in claim 1 wherein said head (32) has a rectangular shape (32b and c) as viewed in cross section.

5. An assembly as set forth in claim 1 wherein said head (32) has a spherical shape (32a) as viewed in cross section.

6. An assembly as set forth in claim 1 wherein said head (32) has a triangular shape (32d) as viewed in cross section.

7. An assembly as set forth in claim 1 including an automotive vehicle comprising a frame (44), an engine (42), mounts (46) for supporting said engine (42) on said frame (44) for vibrational type movement relative thereto, and a heat exchanger (10) supported by said frame (44), said shroud (14) supported relative to said frame (44) adjacent said heat exchanger (10) for directing air through said heat exchanger (10).

8. An assembly as set forth in claim 7 including a floating drive assembly (52, 54, 56) operatively connected to said fan (20) for rotating said fan (20) relative to said shroud (14)

while allowing relative radial movement between said drive assembly (52, 54, 56) and said axis (A) of said hub (22) to accommodate relative movement between said drive assembly (52, 54, 56) and said fan (20) as said drive assembly (52, 54, 56) rotates said fan (20).

9. An assembly as set forth in claim 8 wherein said drive assembly (52, 54, 56) operatively interconnects said engine (42) and said fan (20) to accommodate said vibrational type movement of said engine (42) relative to said fan (20).

10. An assembly (12) for moving air through a heat exchanger (10) comprising:

a shroud (14) presenting a front opening (16) for mating with a heat exchanger (10) and presenting a rear opening (18), a fan (20) disposed in said rear opening (18) comprising a hub (22) having an axis (A) and blades (24) extending radially from said hub (22) to distal ends for moving through said shroud (14), a bearing mechanism (28, 30) interconnecting said distal ends of said blades (24) and said shroud (14) for rotatably supporting said fan (20) solely by said shroud (14), and a floating drive assembly (52, 54, 56) supported independently of said shroud (14) and operatively connected to said hub (22) of said fan (20) for rotating said fan (20) relative to said shroud (14) while allowing relative radial movement between said drive assembly (52, 54, 56) and said axis (A) of said hub (22) to accommodate relative movement radially between said drive assembly (52, 54, 56) and said fan (20) as said drive assembly (52, 54, 56) rotates said fan (20).

* * * * *